United States Patent [19]

Hendry

[11] 4,407,173

[45] Oct. 4, 1983

[54] DEVICE FOR REMOVING INSULATION FROM AN INSULATED CONDUCTOR

[75] Inventor: Robert B. Hendry, Nevada City, Calif.

[73] Assignee: Reon Manufacturing Company, Nevada City, Calif.

[21] Appl. No.: 262,592

[22] Filed: May 11, 1981

[51] Int. Cl.³ .............................................. H02G 1/12
[52] U.S. Cl. ................................... 81/9.5 R; 30/102; 30/90.1
[58] Field of Search ............... 81/9.5 R, 9.5 A, 9.5 C; 30/90.1–90.3, 92–96, 101, 102

[56] References Cited

U.S. PATENT DOCUMENTS

| | | | |
|---|---|---|---|
| 364,090 | 5/1887 | Clayton | 30/102 X |
| 569,533 | 10/1896 | Atkinson | 30/102 X |
| 2,718,058 | 9/1955 | Arnold | 30/102 |
| 3,550,272 | 12/1970 | Hendry | 30/90.1 |
| 3,600,983 | 8/1971 | Hendry | 81/9.5 R |

*Primary Examiner*—James G. Smith
*Assistant Examiner*—Debra S. Meislin

[57] ABSTRACT

A device for removing insulation from an insulated conductor utilizing a cutter which is mounted on a structural base and provides a space adjacent the same for confining the insulated conductor. A finger is also provided for exerting pressure on the insulation of the insulated conductor and pressing the same into contact with the cutter. A mechanism moves the finger in relation to the first and second blades such that rotary motion by the user will cut the insulation about the conductor.

8 Claims, 10 Drawing Figures

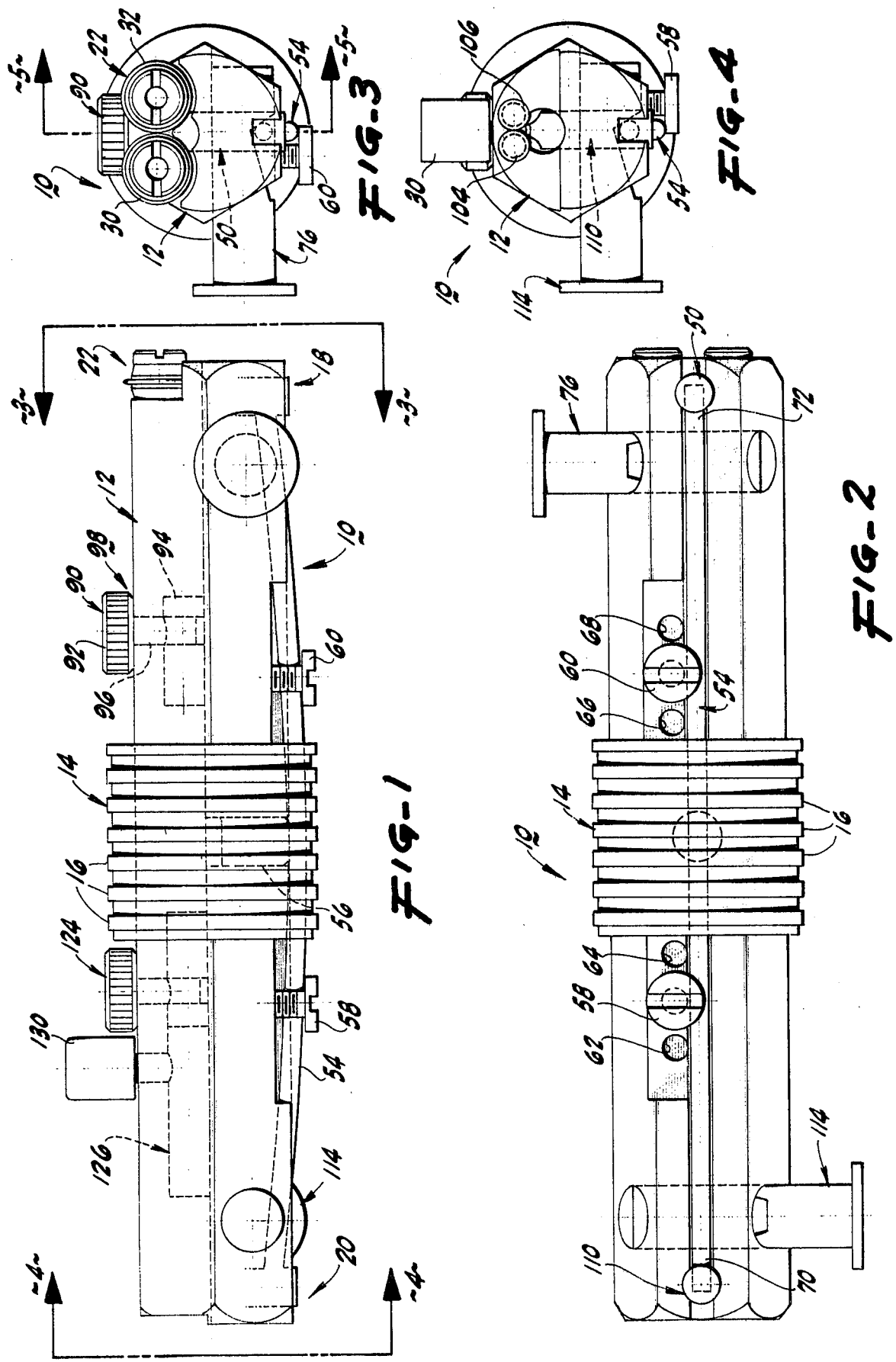

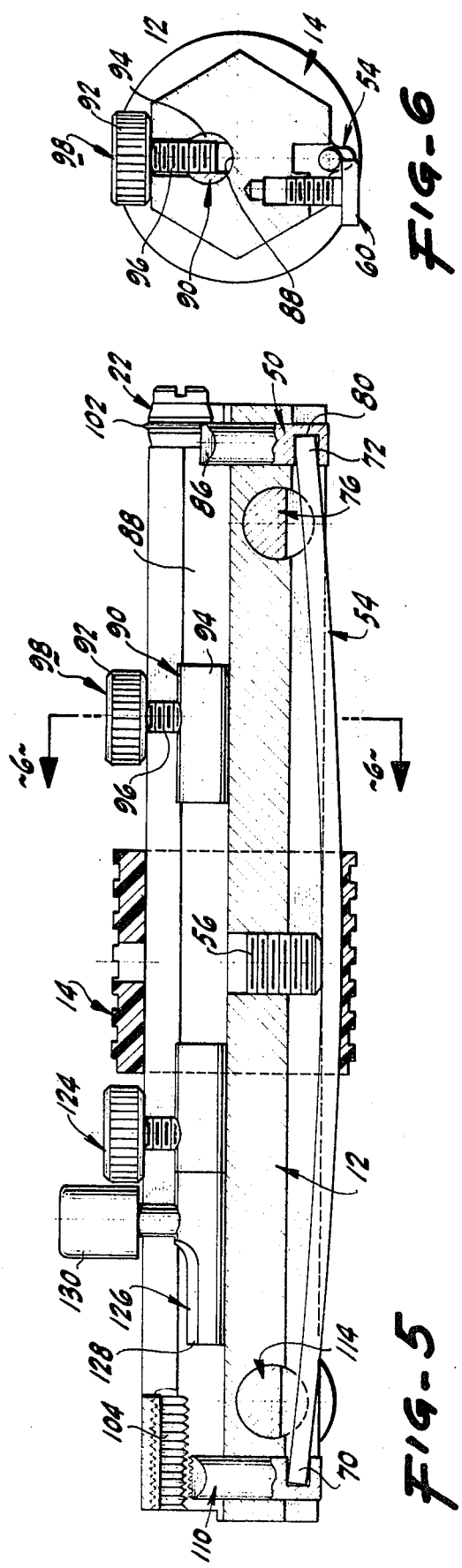
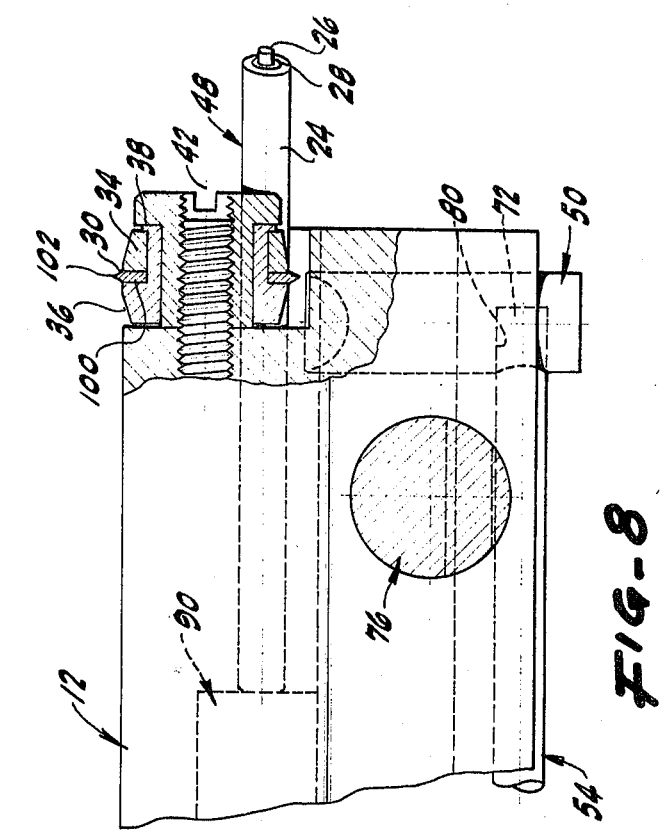
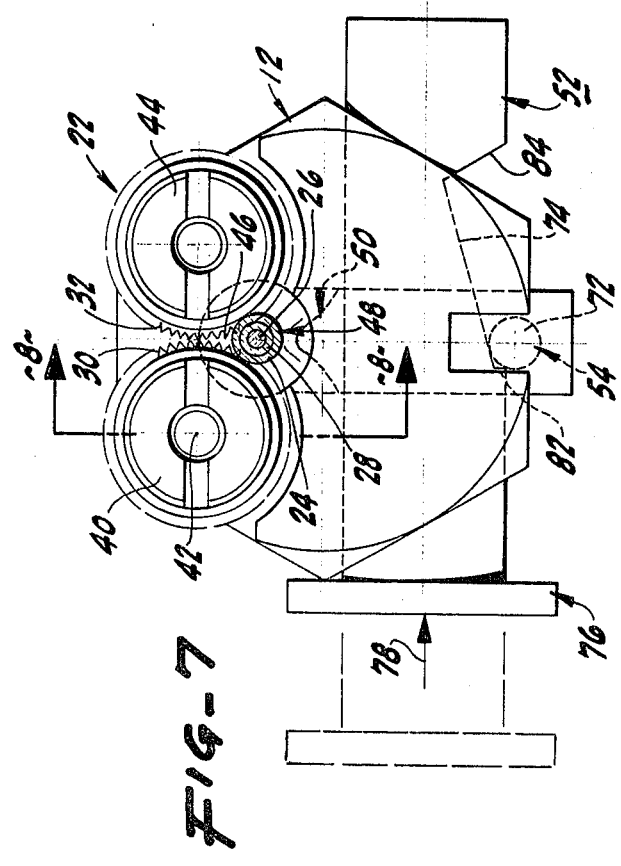

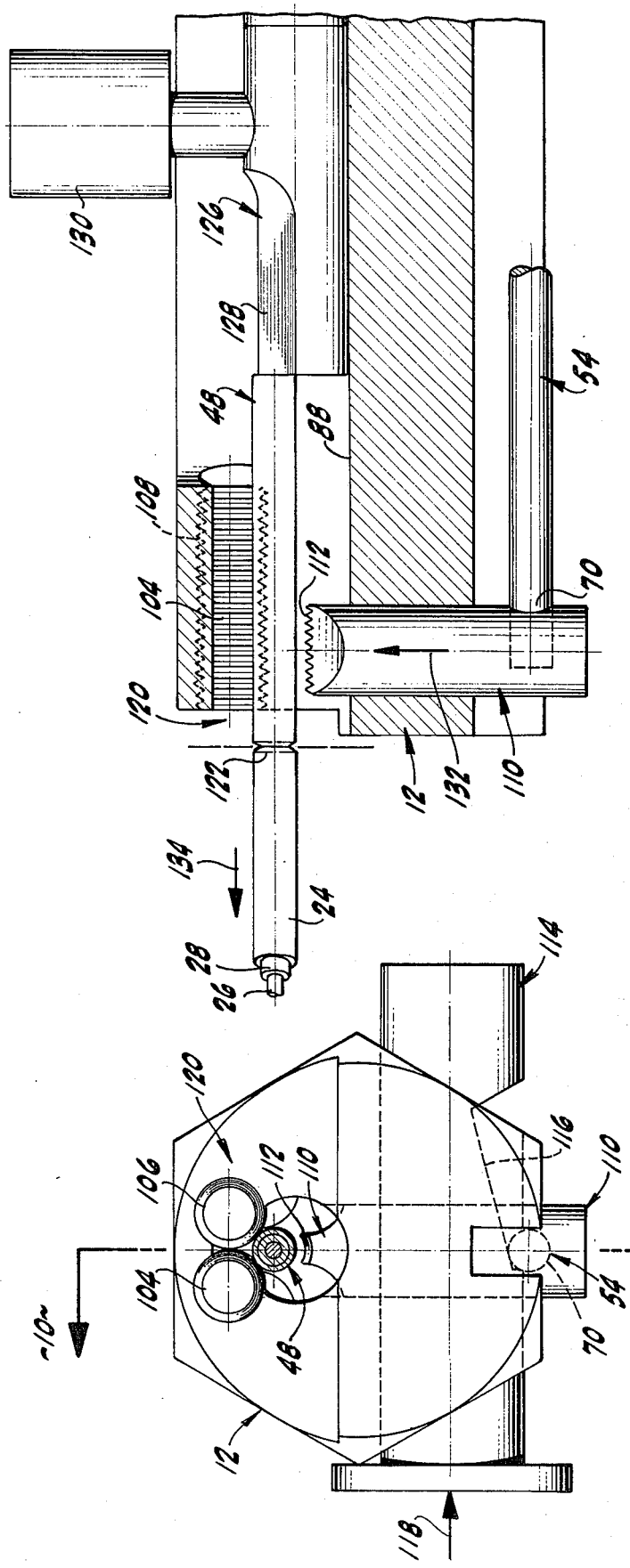

DEVICE FOR REMOVING INSULATION FROM AN INSULATED CONDUCTOR

BACKGROUND OF THE INVENTION

The present invention relates to the field of mechanisms for removing insulation from insulated conductors for attachment of the same to terminals and the like.

It is often necessary to strip insulation from single conductors including those having metal shielding about the wire itself. It is necessary to perform the insulation stripping operation with great accuracy without damaging the wire. Attention is drawn to U.S. Pat. No. 3,600,983 to Hendry which describes a cutting and deforming device which was a great advance in this area. However, it is found that the Hendry device had difficulty in cutting low diameter wires since the mechanism revealed in the above identified patent used three cutting wheels which necessarily left a space surrounded by the wheels which could not be reduced beyond a certain dimension.

There are no known devices or techniques for easily stripping single, small diameter insulated conductors. It should be noted that accurate cutting and stripping of insulation from a shielded conductor assumes a greater importance with smaller conductors since they are more prone to damage than larger conductors. A device or method for removing insulation from an insulated conductor of small diameter accurately and efficiently is needed in the electronic field.

SUMMARY OF THE INVENTION

In accordance with the present invention a novel and useful device for removing insulation from an insulated conductor is provided.

The device of the present invention employs cutting means intended for severing or cutting the insulation surrounding the conductor and/or the shield surrounding the conductor. The cutting means is mounted on a structural base and may take the form of a pair of cutting blades mounted adjacent to one another. The blades may be formed such that each includes a core and a cutting edge about the periphery of the core, for example, the cutting blade may be circular, oval, or of other configurations. A space would be formed adjacent to the cutting means and is intended for accommodating or confining the insulated conductor. The space may take the form of a notch or the like and would provide for the insulation possessing the capability of contacting the cutting means while occupying the space. Each of the cutting blades may be formed to be rotatable about an axis.

The device of the present invention also embraces the provision of a finger or anvil which is intended for exerting pressure on the insulation of the insulated conductor. The finger would be positioned to hold the insulation of the insulated conductor within the space formed by the cutting means and in contact with the cutting means. The finger may also include means for moving the finger in relation to the cutting means as well as means for fixing the position of the finger in relation to the cutting means. Such fixation may include a position where the insulation of the insulated coductor contacts the blades and the finger simultaneously such that the insulation of the insulated conductor is in sliding engagement with the finger. In addition, where the cutting includes a pair of blades, a spacer may be provided with each of the blades and positioned along the axis of rotation. Each spacer would serve as a support surface and as a wall of the confining space for the insulated conductor. A stop means may also be formed to prevent contact between the cutting blades and the finger.

In the case where means for fixing the position of the finger in relation to the cutting blades is provided, such means may include a resilient bar having a first end portion and a second end portion connected to the finger at the first end portion thereof. The second end portion of the bar would be connected to the structural base thus forcing the finger toward the first and second blades. Such a structure would also include means for moving the first end portion of the bar away from first and second cutting blades. Also, the resilient bar may have an adjustable tensioning feature. In addition, the means for moving the first end portion of the bar away from the first and second cutting blades may include a member having a cam surface which ridingly engages a portion of the bar which can travel along the cam surface for a selected distance of travel.

The device of the present invention may also include means for gauging or determining the place of cutting of the insulation by the cutting means. Such a gauging means may include a channel formed on one side of the cutting blades by the structural base which is intended for holding the insulated conductor behind the space or notch formed by the blades. Also, means would be included for selecting the distance of penetration of the insulated conductor into the channel. The device may further include means for gripping the insulation on the insulated conductor after cutting by the cutting means for removal of the insulation from the conductor.

It may be apparent that a novel and useful device for removing insulation from an insulated conductor has been described.

It is therefore an object of the present invention to provide a device for removing insulation from an insulated conductor which can cut and/or deform the insulation surrounding the conductor without damage to the conductor or the shield surrounding the conductor.

It is another object of the present invention to provide a device for removing insulation from an insulated conductor which is especially useful for stripping insulation from small single wire conductors accurately and efficiently.

It is yet another object of the present invention to provide a device for removing insulation from an insulated conductor which minimizes labor effort required to strip insulation accurately and safely from insulated conductors.

The invention possesses other objects and advantages especially as concerns particular features and characteristics thereof which will become apparent as the specification continues.

BRIEF DESCRIPTION OF THE DRAWINGS

FIG. 1 is a side elevational view of the embodiment of the present invention.

FIG. 2 is a top plan view of an embodiment of the present invention.

FIG. 3 is a view taken along line 3—3 of FIG. 1.
FIG. 4 is a view taken along line 4—4 of FIG. 1.
FIG. 5 is a view taken along line 5—5 of FIG. 3.
FIG. 6 is a view taken along line 6—6 of FIG. 5.

FIG. 7 is an enlarged view of FIG. 3 showing the operation of a cam mechanism and the cutting means on an insulated conductor.

FIG. 8 is a view taken along line 8—8 of FIG. 7.

FIG. 9 is an enlarged view of FIG. 4 depicting the gripping and removal mechanism for insulation scored by the mechanism depicted in FIGS. 3 and 7.

FIG. 10 is a view taken along line 10—10 of FIG. 9.

For a better understanding of the invention reference is made to the following detailed description which should be references to the hereinabove described drawings.

DETAILED DESCRIPTION OF THE PREFERRED EMBODIMENTS

Various aspects of the present invention will evolve from the following detailed description of the preferred embodiments thereof which should be taken in conjunction with the hereinabove described drawings.

The invention as a whole is represented in the drawings by reference character 10. The device 10, FIGS. 1 and 2, includes a structural base 12 which may be formed of any metallic or nonmetallic material possessing a degree of rigidity such as stainless steel, aluminum, and the like. Base 12 is elongated and is hexagonally faceted to aid in the gripping of the same. Base 12 includes a gripping portion 14 having a plurality of ridges 16 on the surface thereof. Base 12 includes an insulation cutting end 18 and an insulation removal end 20.

Device 10 also embraces cutting means 22, FIGS. 1, 3, and 5, which is intended for cutting insulation 24 from conductor 26 and shield 28, FIGS. 7 and 8. Cutting means 22 may take the embodiment shown in FIGS. 7 and 8 in the form of a first cutting blade 30 and a second cutting blade 32. With reference to FIG. 8 it may be seen that blade 30 (blade 32 is similarly mounted) sandwiches between washer 34 and bushing 36 having a rolled over edge portion 38. A set screw 40 threadingly engages base 12 and holds blade 30 in place. Thus, blade 30 and sandwiched washer 34 and bushing 36 rotates as a unit about the axis 42 of set screw 40. Set screw 44 performs a similar function with blade 32. Blades 32 and 34 are mounted in side-by-side disposition on base 12 and form a space 46 therebetween. Space 46 is a notch or crevice which is intended for accommodating insulated conductor 48. As shown on FIG. 7, insulation 24 is capable of contacting both cutting blades 30 and 32 simultaneously.

A finger or anvil 50 exerts pressure on insulation 24 while confined to space 46 between blades 30 and 32. As depicted in FIG. 7, finger 50 includes means 52 for moving finger 50 in relation to cutting means 22. Means 52 includes a resilient bar 54 which is fixed in its central portion to base 12 by the means of threaded screw 56 and machine screws 58 and 60 on either side of threaded screw 56. Machine screws 58 and 60 may be placed in threaded openings 62, 64, 66, or 68, as well as the threaded opening being engaged in FIG. 2. Thus, the pressure exerted by threaded screw 56, which is the opposite of the pressure exerted by machine screws 58 and 60, not only holds bar 54 in place on base 12 but movement of machine screws 58 and 60 adjust the stiffness or resiliency of the end portions 70 and 72 of bar 54.

Returning to FIG. 7, it may be seen that end portion 72 of bar 54 rides on cam surface 74 of member 76. As shown in FIG. 7, by directional arrow 78, movement from left to right of member 76 causes the retreat or movement of finger 50 away from insulation 24. Movement in the opposite direction from that shown on FIG. 7 would result in finger 50 pressing into sliding engagement on the outer surface of insulation 24 of conductor 48 causing insulation 24 to contact the teeth of blades 30 and 32. As shown on FIG. 5, it may be seen that finger 50 engages end portion 72 of resilient bar 54 within a slot 80. Surfaces 82 and 84 adjacent cam surface 74 of member 76 serve as stop means for preventing contact between cutting blades 30 and 32 and the chisel-shaped tip 86 of finger 50, FIGS. 5 and 7.

Base 12 also includes a channel 88 which extends into the interior thereof from space 46 between cutting blades 30 and 32. Channel 88 is sized to accommodate insulated conductor 48 and includes an adjustable plug 90 which limits the travel of conductor 48 into channel 88, FIGS. 5, 6, and 8. Cap 92 of adjustable plug 90 may be formed into contact with the outer surface of base 12 to frictional engage the same and fix member 94 in place within channel 88. Threaded shaft 96 engages a threaded opening within member 94 to create such frictional engagement. Channel 88 and adjustable plug 90 comprise means 98 for gauging the place of cutting of the insulation 24 of insulated conductor 48. Means 98 selects the distance of penetration of insulated conductor 48 into channel 88. It should be noted that although blades 30 and 32 are shown as having a circular configuration, blades 30 and 32 may have other configurations including a core 100 and a cutting edge 102. Cutting edge 102 is shown as being serrated although other types of cutting edges may be used in conjunction with the type of insulation 24 found around conductor 26.

The insulation removal end 20 of base 12 includes an anvil 110 and a pair of pins 104 and 106 each having a ridged surface such as surface 108 of pin 104, FIGS. 5, 9, and 10. An anvil 110 having a ridged surface 112 at one end thereof is formed to squeeze insulated conductor 48 to pins 104 and 106. Anvil 110 is connected to end portion 70 of resilient bar 54 and is moved to or from contact with insulated conductor 48 by the use of member 114 having a cam surface 116 which slidingly engages end portions 70 of bar 54. As shown in FIG. 9 by directional arrow 118, movement from left to right of member 114 moves anvil 110 away from pins 104 and 106. Movement in the opposite direction will force anvil 110 toward pins 104 and into gripping relationship with conductor 48. Thus, anvil 110 and the mechanism for moving the same as well as pins 104 and 106 comrpise means 120 for gripping insulation 24 on insulated conductor 48. Turning to FIG. 10, it may be seen that insulated conductor 48 has been cut by the use of cutting means 22 at cut area 122. Cutting means 22 may be positioned such that a small portion of insulation 24 remains about shield 28 at cut area 122. Thus, shield 26 is not damaged by cutting means 22. Plug 124, which is similarly constructed to plug mean 90, limits the penetration of conductor 48 into channel 88 at insulation removal end 20 of device 10. Thus, adjustable plug means 124 would generally position cut area 122 of insulated conductor outside of channel 88 during the activation of means 120 for gripping insulation 24. Channel reamer 126 will clear any portion of insulation 24 remaining therein after removal from insulated conductor 48. Reamer 126 includes a tongue 128 which pushes any remaining portion of insulation 24 from channel 88 by movement of head 130 toward pins 104 and 106.

In operation, the user adjusts the threaded screw 56 such that end portions 70 and 72 ride on cam surfaces 74 and 116 of members 76 and 114 respectively. Insulated conductor 48 is inserted within channel 88 at the cutting end 18 of member 12. Adjustable plug 90 is positioned such that cutting means 22 will function at the proper distance from the end of insulated conductor 48. Member 76 is moved from right to left, FIG. 7, such that finger 50 moves upwardly into sliding engagement with insulated conductor 48, thus forcing the same into contact with cutting blades 30 and 32. The user holds the end of insulator 48 extending outside of channel 88 and rotates device 10 and cutting blades 30 and 32 around the periphery of insulation 24. Cutting blades 30 and 32 will perforate insulation 24 while finger 50 slides along the surface thereof and maintains the cutting action of cutting blades 30 and 32 to the proper depth within insulation 24. Member 76 is pushed from left to right, FIG. 7, which releases the pressure of finger 50 and allows the removal of cut insulated conductor 48 from channel 88. The user then flexes insulated conductor 48 to propagate a break of insulation about the periphery of insulated conductor 48. The user then inserts this end portion of insulated conductor 48 into channel 88 at the insulation removal end 20 of base 12, specifically into channel 88 thereof. Member 114 is moved from right to left, FIG. 9, to cause anvil 110 to squeeze insulated conductor 48 between pins 104 and 106, directional arrow 132, FIG. 10. The user then pulls a portion of conductor 48 extending outside channel 88 in the direction of arrow 134, FIG. 10, to remove insulation 24 from the conductor and shield 26 and 28 of insulated conductor 48. Channel reamer 26 is then pushed toward pins 104 and 106 to eject the removed portion of insulation from channel 88. Shield 28 may be peeled back to bear conductor 26 for connection to a terminal or the like.

While in the foregoing embodiments of the present invention have been set forth in considerable detail for the purposes of making a complete disclosure of the invention, it may be apparent to those of ordinary skill in the art that numerous changes may be made in such details without departing from the spirit and principles of the invention.

What is claimed is:

1. A device for removing insulation from an insulated conductor comprising:
   a. cutting means intended for cutting the insulation, said cutting means being mounted on a structure base said cutting means including a first and second cutting blade mounted adjacent to one another on said structural base, said cutting base forming a space for confirming the insulated conductor such that the insulation of the insulated conductor may contact said cutting means while occupying said space;
   b. a finger intended for exerting pressure on the insulation of the insulated conductor while being confined to said space adjacent said cutting means; said finger being mounted to said structural base;
   c. means for moving said finger in relation to said cutting means, said means for moving said finger in relation to said cutting means including a resilient bar having a first end portion and a second end portion said bar being connected to said finger at said first end portion of said bar and being connected to said structural base at said second end portion thereof such that said first end portion of said bar and said finger are forced toward said first and second blades; and
   d. means for moving said first end portion of said bar away from said first and second cutting blades.

2. The device of claim 1 in which said first and second blades each include a core having a cutting edge about the periphery thereof and each blade further including means for rotating said blade about an axis.

3. The device of claim 2 in which each of said blades includes a spacer positioned along said axis.

4. The device of claim 3 which additionally comprises stop means for preventing contact between said first and second cutting blades and said finger.

5. The device of claim 4 in which said means for moving said first end portion of said bar away from said first and second cutting blades includes a member having a cam surface, said bar riding said cam surface during a selected distance of travel of said member.

6. The device of claim 5 which additionally comprises means for controlling the resiliency of said bar.

7. The device of claim 6 which additionally comprises means for gauging the place of cutting of the insulation by said first and second blades, said gauging means comprising a channel formed on one side of said cutting blade by said structural base, said channel intended for holding the insulated conductor, and means for selecting the distance of penetration of the insulated conductor into said channel.

8. The device of claim 7 which additionally includes means intended for gripping the insulation on said insulated conductor.

* * * * *